United States Patent

Kokubu

[11] Patent Number: 5,089,715
[45] Date of Patent: Feb. 18, 1992

[54] MULTIPOSITION SWITCH DEVICE FOR CONTROLLING A DRIVING MEANS

[75] Inventor: Sadao Kokubu, Aichi, Japan

[73] Assignee: Kabushiki Kaisha Tokai-Rika-Denki-Seisakusho, Aichi, Japan

[21] Appl. No.: 510,680

[22] Filed: Apr. 18, 1990

[30] Foreign Application Priority Data

Apr. 26, 1989 [JP] Japan ............ 1-49241[U]

[51] Int. Cl.⁵ ............ H01H 9/24; B60L 1/00
[52] U.S. Cl. ............ 307/10.1; 200/408; 200/459; 200/1 V; 340/438
[58] Field of Search ........ 307/10.1, 9.1, 113, 307/115, 139, 140; 200/339, 408, 409, 461, 459, 315, 5 R, 1 B, 1 V, 6 R, 6 B; 340/438, 456, 457, 709; 361/139, 160, 191, 192; 318/256, 264, 265, 266, 280, 283, 286, 466, 468, 469; 341/20

[56] References Cited

U.S. PATENT DOCUMENTS

| | | | |
|---|---|---|---|
| 3,413,430 | 11/1968 | Sharples | 200/1 B |
| 4,107,482 | 8/1978 | Marker | 200/6 B |
| 4,242,551 | 12/1980 | Sorenson | 200/315 |
| 4,376,896 | 3/1983 | Takeda et al. | 307/115 |
| 4,801,812 | 1/1989 | Brusasco | 307/10.1 |
| 4,808,775 | 2/1989 | Satoh et al. | 200/1 V |
| 4,983,794 | 1/1991 | Kokubu | 200/461 |

Primary Examiner—A. D. Pellinen
Assistant Examiner—Richard Elms
Attorney, Agent, or Firm—Sixbey, Friedman, Leedom & Ferguson

[57] ABSTRACT

A switch device for making a motor or the like alternate between forward reverse rotation, having a pair of switches and a control circuit. When either one of the switches is activated, the control circuit activates the motor in one or the other direction depending upon which switch is activated. When both switches are activated, the control circuit activates the motor until a desired action or task is completed. Therefore, when the present invention is used in a window glass lifting apparatus of an automobile, three kinds of operations of the window glass can be performed by using a pair of switches: partial upward and partial downward movement and continuous movement down to the fully open state of the window glass.

21 Claims, 13 Drawing Sheets

F I G. 10
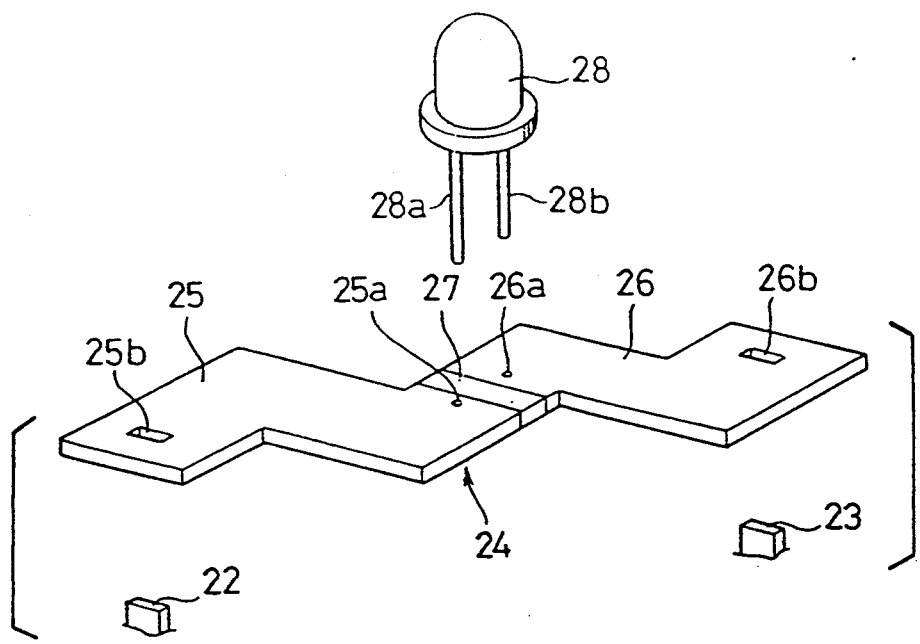
F I G. 11
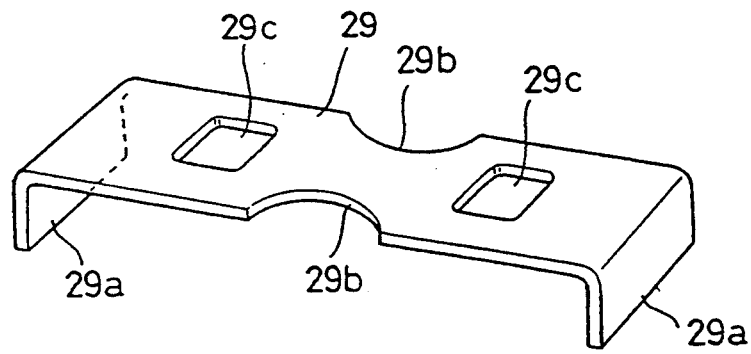
F I G. 12
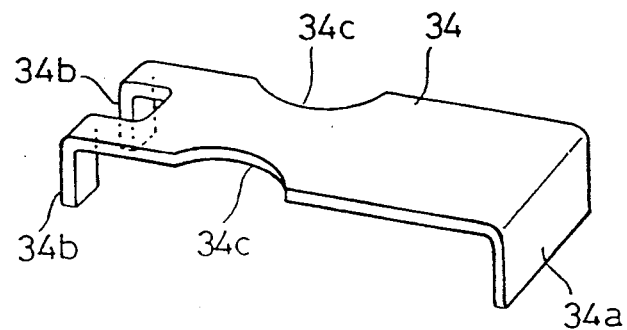

FIG.13

| INPUT OR OUTPUT / MODE | Ia | Ib | Oa | Ob |
|---|---|---|---|---|
| STOP | L | L | L | L |
| LOWER | H | L | H | L |
| LIFT | L | H | L | H |
| AUTOMATIC LOWER AND LIFT | H | H | H (CONTINUOUSLY) | L |

MULTIPOSITION SWITCH DEVICE FOR CONTROLLING A DRIVING MEANS

BACKGROUND OF THE INVENTION

1. Field of the Invention

The present invention relates to a switch device capable of detecting three distinct operational actions and being selectively activated to perform 4 distinct operations.

2. Background Information

Some switch devices used for raising and lowering a door window glass of an automobile comprise, in addition to a raising switch and a lowering switch, a third switch used to enable a passenger to completely close or open the window glass simply by just a single brief operation.

In these devices, at least three switches are needed to achieve two distinct modes of operation: first, to raise or lower a door window glass just while a passenger manipulates and holds a knob in position, and alternatively, to move the window glass to its final destination (either completely closed or completely open) by virtue of the passenger simply manipulating a knob in one brief stroke.

SUMMARY OF THE INVENTION

Taking the above facts into consideration, it is an object of the present invention to provide a switch device capable of responding to three different operational actions, and of detecting three corresponding operating states, as described above, achieved by two switches, as well as a fourth state of non-operation.

In the present invention, a control circuit connected to a pair of switches and to an operating member judges the following four states: both switches being in a non-activated state, either one of the switches being in an activated state, and both switches being in an activated state. In the state in which neither switch is activated, a load such as a motor or the like is not actuated. In the state in which either one of the switches is activated, a load is driven in one of two opposite directions depending upon which switch is activated. In the state in which both switches are activated, a load is driven until a desired driving action is completed. Thus, four kinds of operating states of a control circuit and a corresponding load can be controlled by using two switches and one operating member.

BRIEF DESCRIPTION OF THE DRAWINGS

FIG. 10 is a perspective view showing a connecting member;

FIG. 11 is a perspective view showing a return member;

FIG. 12 is a perspective view showing an interlock lever;

FIG. 13 is a diagram showing the relationship between an input signal and an output signal of a detection control circuit;

DESCRIPTION OF THE PREFERRED EMBODIMENT

The present invention will be described below with respect to an embodiment applied to a window regulator of an automobile with reference to drawings.

Figure 1:
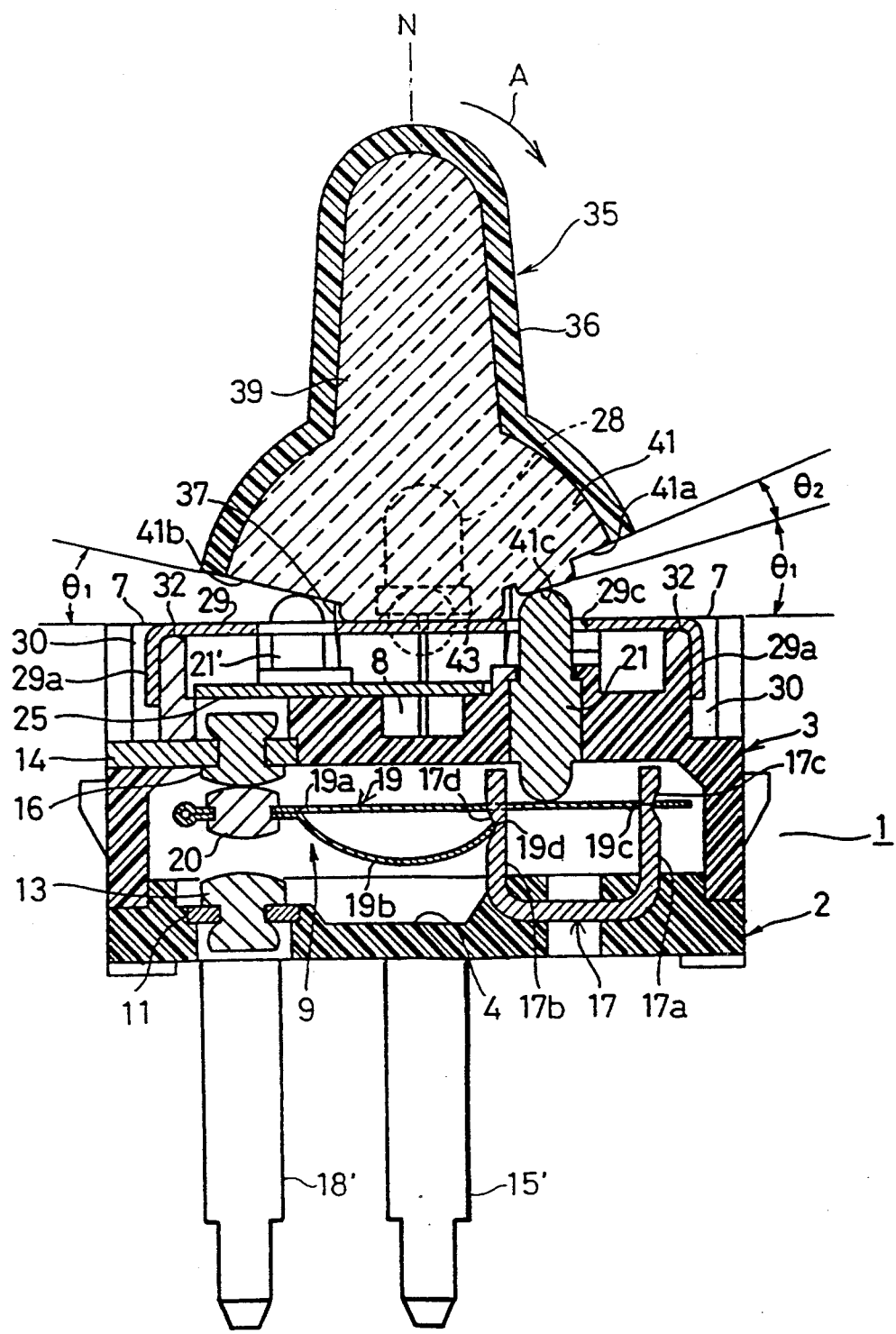
FIG. 1 is a cross-sectional view showing a switch device according to an embodiment of the present invention taken along the 1—1 of FIG. 2.
Figure 2:
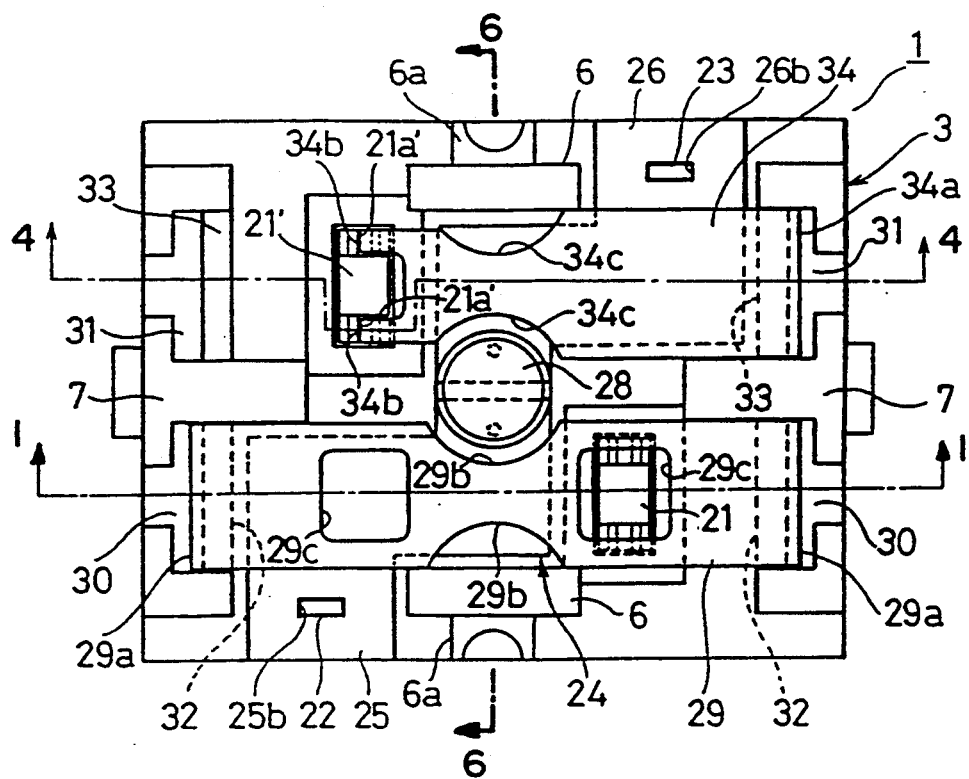
FIG. 2 is a plan view of the switch device of FIG. 1.
Figure 3:
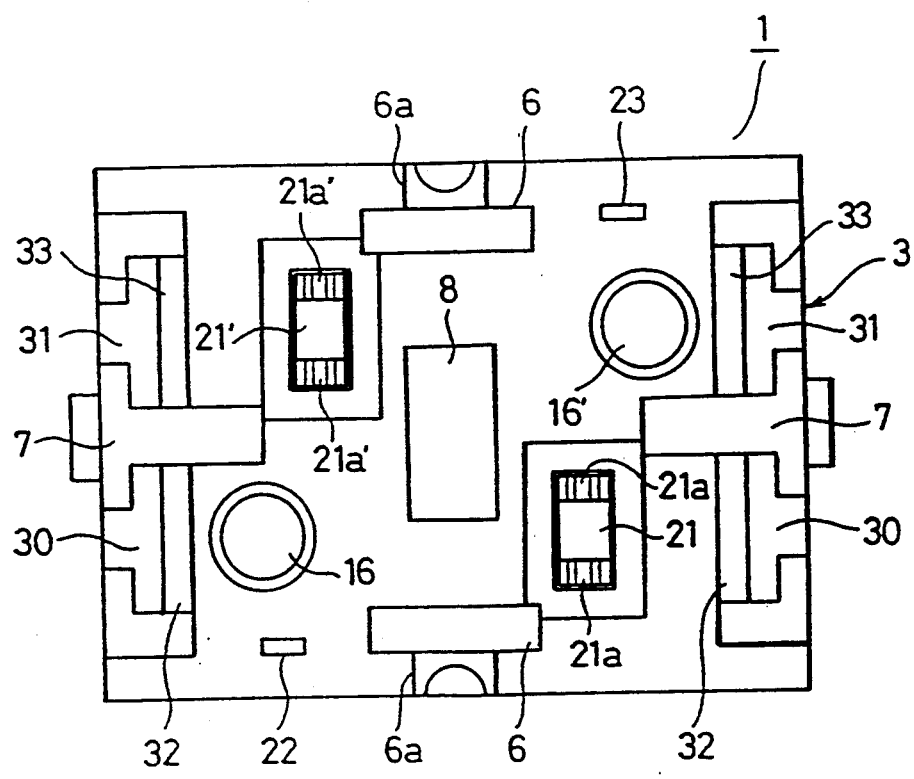
FIG. 3 is a plan view wherein a portion of FIG. 2 is removed.
Figure 4:
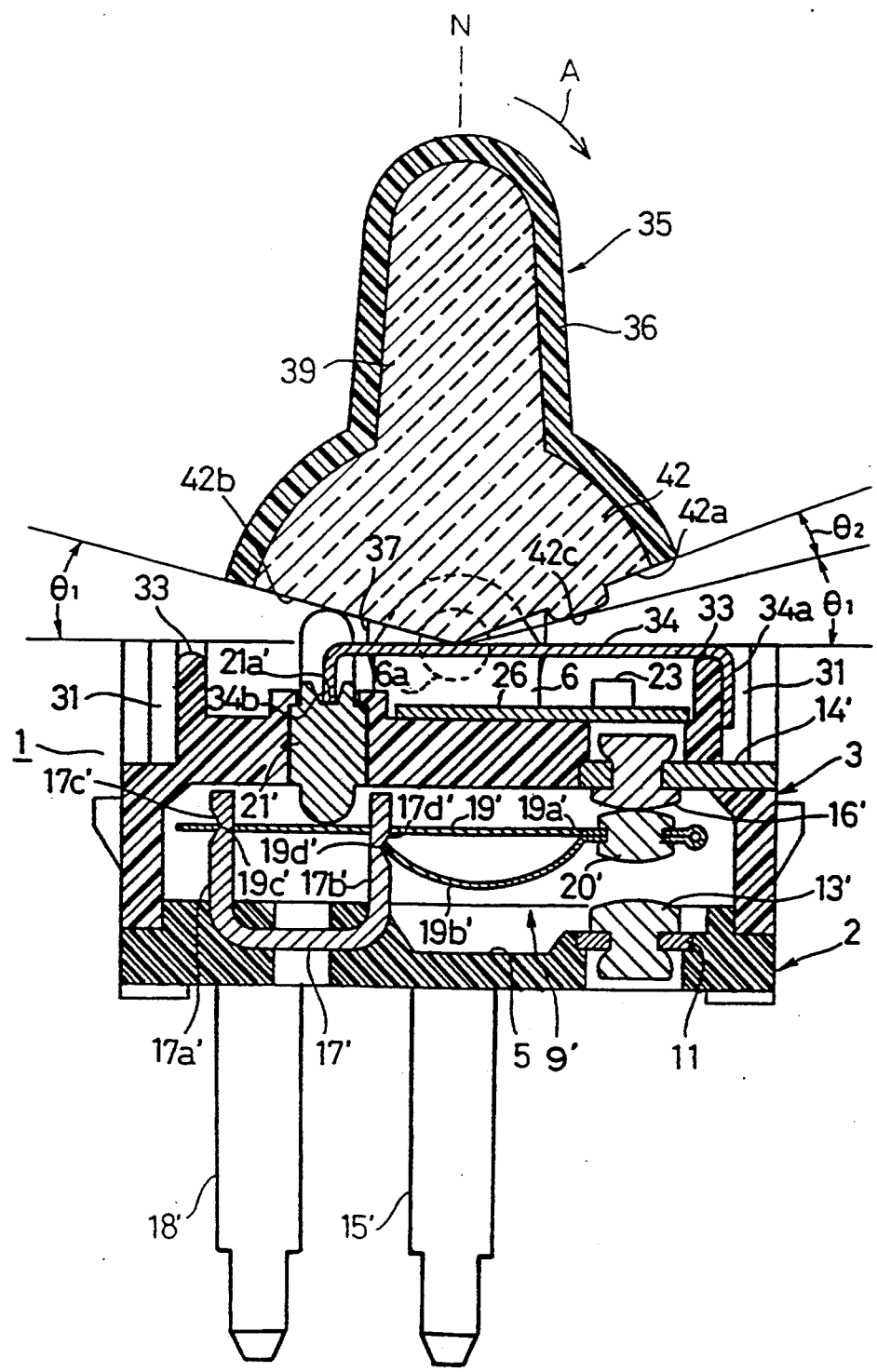
FIG. 4 is a cross sectional view taken along the line 4—4 of FIG. 2.
Figure 5:
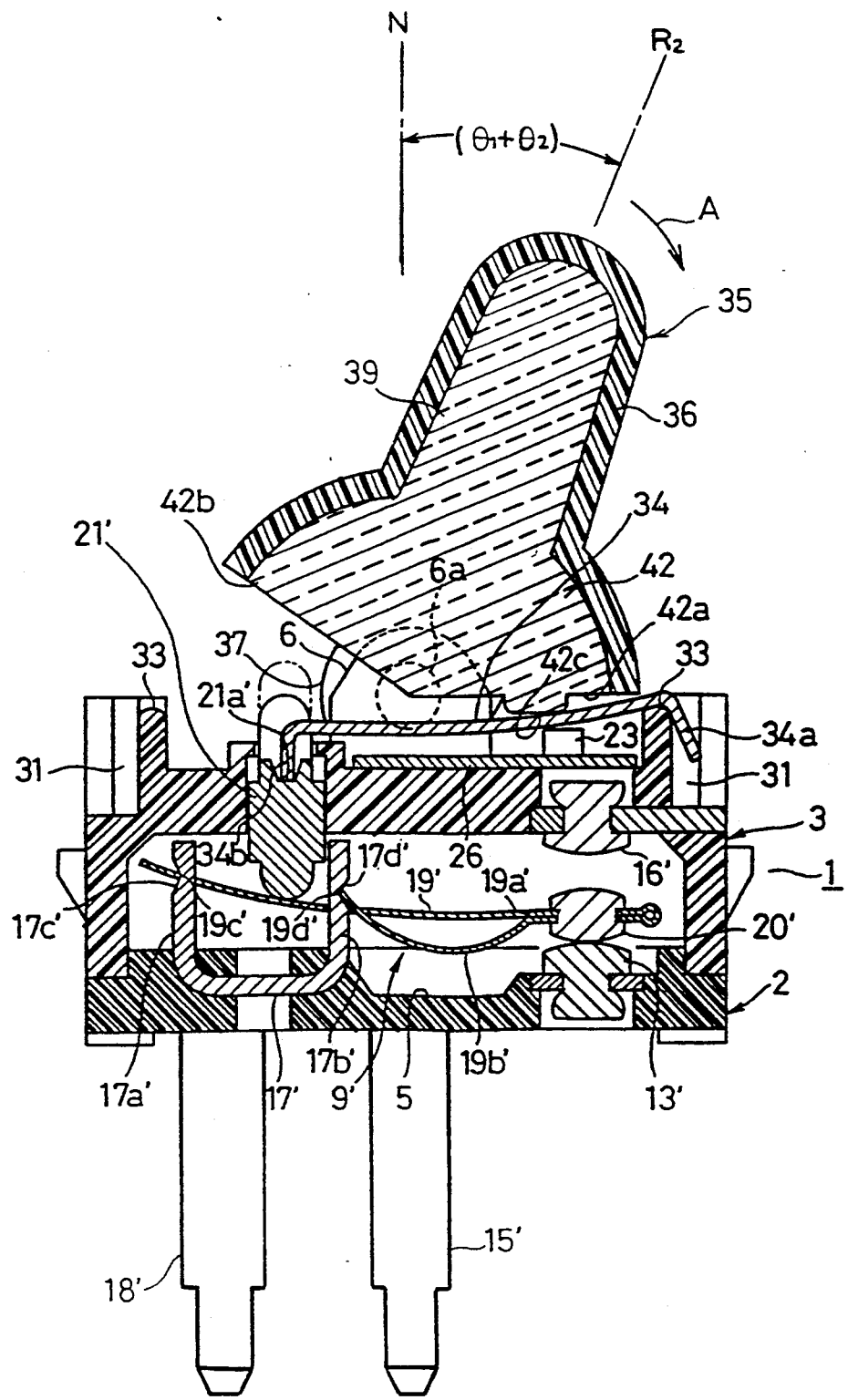
FIG. 5 is a sectional view of the switch device showing a subsequent operated situation changed from a situation shown in FIG. 2.
Figure 6:
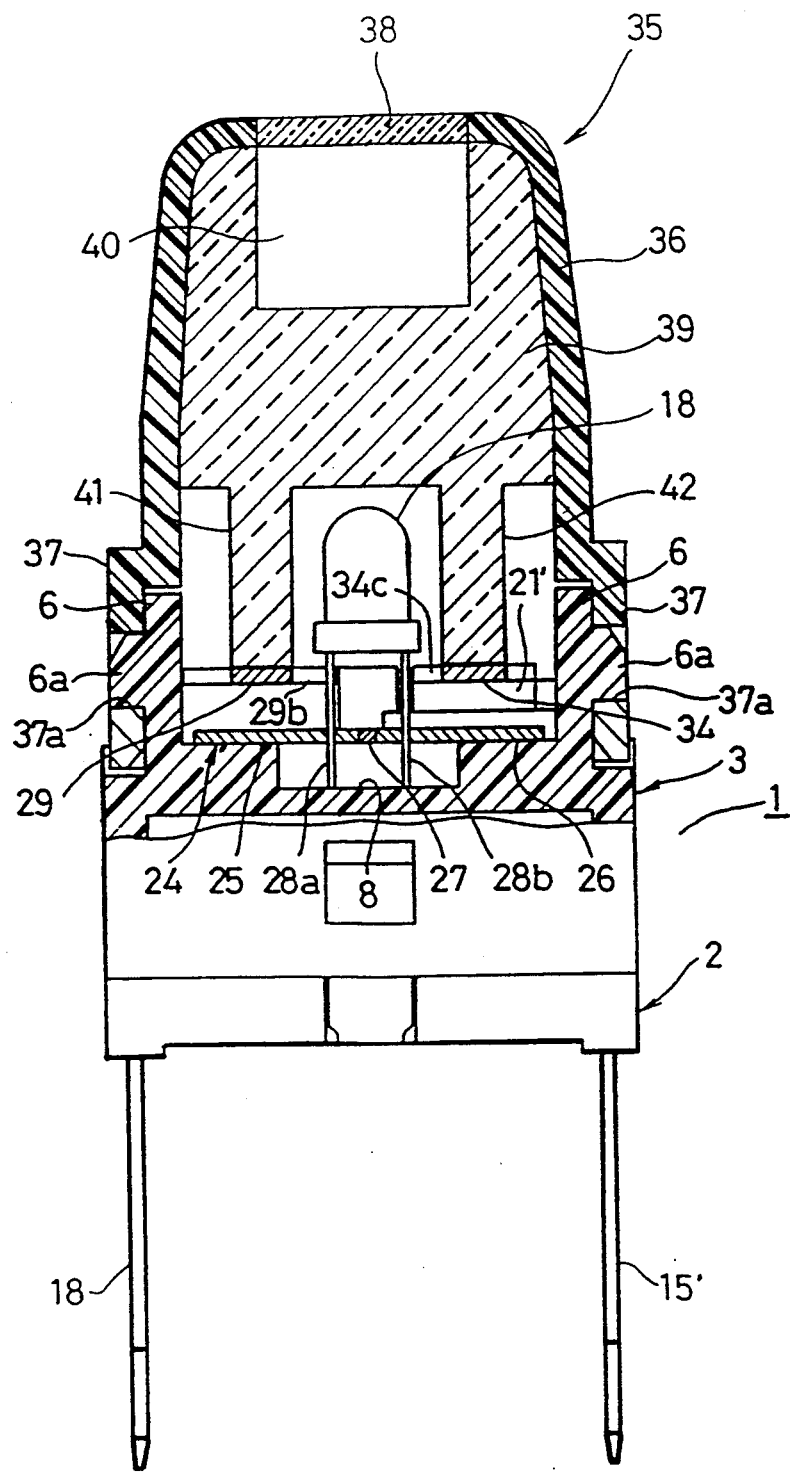
FIG. 6 is a cross sectional view taken along the line 6—6 of FIG. 2.
Figure 7:
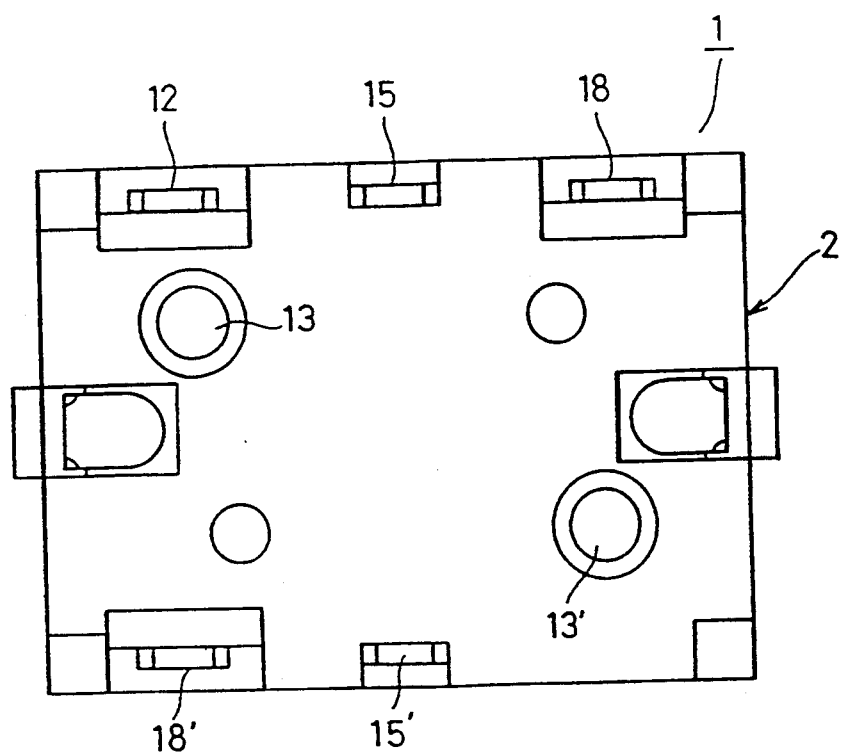
FIG. 7 is a bottom view of FIG. 1.

As shown in FIGS. 1 to 9, and 15, a switch device 1 comprises a substantially rectangular plastic base 2 and a substantially rectangular case 3 having an open bottom surface. The case 3 is mounted by tightly fitting it on the upper perimeter of the base 2. As shown in FIGS. 1 and 5, recessed portions 4 and 5 are formed in parallel on the upper surface of the base 2. Further, as shown in FIGS. 2 and 3, the case 3 is formed as a rectangular flat shape having a long side and a short side, and brackets 6 are projected upward (in the upper direction in FIG. 4) at the center of the case 3 in the longitudinal direction (in the horizontal direction in FIG. 2) and from the edges of the case 3 in the lateral direction thereof (in the vertical direction in FIG. 2). These brackets 6 are coaxially provided with pins 6a directed in the direction along which they are separated from each other and these pins support a knob 35. In addition, knob stoppers 7 project from the upper edges at opposite ends of the case 3 in the longitudinal direction thereof to restrict the rotational angle of the knob 35.

Figure 15:
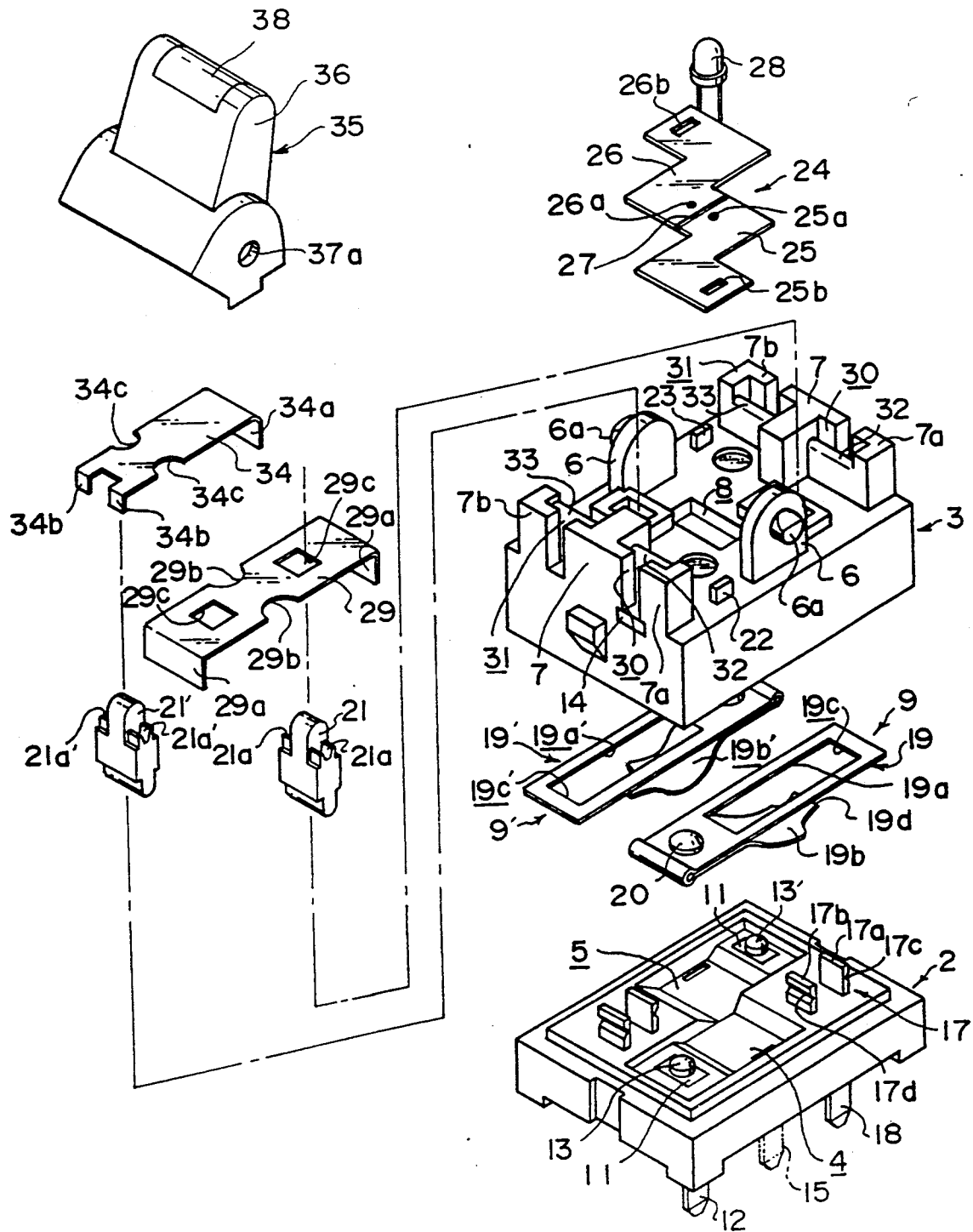
FIG. 15 is an exploded perspective view of the embodiment according to the present invention.

In FIGS. 1 and 15, a first switch 9 is disposed in the base 2 and the case 3 directly above and in correspondence to the recessed portion 4 of the base. A fixed contact conductor 11 is fixed to the base 2 by insert molding and a portion thereof is extended to serve as a terminal 12 projecting downward from the base 2. A portion of the fixed contact conductor 11 is exposed in the recessed portion 4 and the open at rest side fixed contact 13 is fixed to the exposed portion to form the resting open side of the switch. A fixed contact conductor 14 is fixed to the case 3 by insert molding and a portion thereof is extended to serve as a terminal 15 projecting downward from the base 2. The fixed contact conductor 14 has a portion which faces the fixed contact 13 and is exposed in the lower surface of the case 3 and a cylindrical closed-at-rest fixed contact 16 is fixed to the exposed portion.

A terminal 17 is buried in the base 2. The terminal 17 is composed of a conductive plate formed into a substantially "U" shape and fixed to the base 2 by insert molding. The terminal 17 has first and second support portions 17a and 17b projecting upward from the base 2 and notch-shaped locking portions 17c and 17d formed on the two opposite surfaces thereof, respectively, and the locking portion 17d of the second support portion 17b is located at a position lower than the locking portion 17c of the first support portion 17a, that is, nearer to the base 2. Note that the terminal 17 has a terminal 18 projecting downward from the base 2 (refer to FIG. 7).

A movable contact plate 19 composed of leaf spring is disposed so as to correspond to the terminal 17. The contact plate 19 comprises an upper side section having a hole 19a and a lower side section having a curved portion 19b. The movable contact plate 19 is bent and folded at an intermediate portion, namely the free ends of the upper side and lower side sections, where a cylindrical movable contact 20 is disposed. A fulcrum 19c at the right edge of the hole 19a is locked to the locking portion 17c of the first support 17a of the terminal 17 and a fulcrum 19d at the base portion of the curved portion 19b is locked to the locking portion 17d of the second support 17b. In the above state, a displacement force is applied to the movable contact plate 19 by a spring action of the curved portion 19b so that the free end thereof is directed in an obliquely upward direction in FIG. 1, and the upward component of the force causes the movable contact 20 to be brought into contact with the resting-closed-side fixed contact 16 by virtue of contact pressure.

A first actuator 21 mounted to the case 3 so that it is vertically movable, has a lower edge which is held in abutment against the base end of the movable contact plate 19.

In FIG. 4, numeral 9' designates a second switch disposed in the base 2 and the case 3 in correspondence to the recessed portion 5 in a direction opposite to and in parallel with the above switch 9. The switch 9' has the same arrangement as that of the switch 9 and those parts thereof which are identical to those of the switch 9 are designated by identical reference characters with (').

Thus, the fixed contact conductor 11 is common to the switches 9 and 9' and has a positive side auxiliary terminal 22 (refer to FIGS. 2 and 3) extending upward from the vicinity of the fixed contact 13 and the upper end thereof projects upward from the upper surface of the case 3. Further, a fixed contact conductor 14' has a negative side auxiliary terminal 23 extending upward from the vicinity of a fixed contact 16' and the upper end thereof projects upward from the upper surface of the case 3.

FIG. 10 shows a rubber connecting member 24 mounted on the case 3. The rubber connecting member 24 is a so-called zigzag plate member having an insulating region 27 at the center, joining a crown-shaped positive side connecting member 25 to a crown-shaped negative side connecting member 26. The positive and negative side connecting members 25 and 26 respectively have mounting holes 25a and 26a of small diameter formed in the ends which are joined by and through insulating region 27 and substantially rectangular insert holes 25b and 26b formed in an external end of the connecting members 25 and 26, respectively. The positive and negative side connecting members 25 and 26 comprise a resistance member having a predetermined resistance value formed by mixing a conducting material with rubber, and the insulating region 27 comprises a member of very high resistance formed of rubber with no conducting material included. The connecting member 24 is placed on the upper surface of the case 3 so that the positive side auxiliary terminal 22 of the above fixed contact conductor 11 is inserted into the insert hole 25b and the negative side auxiliary terminal 23 of the above fixed contact conductor 14' is inserted into the insert hole 26b. In this arrangement, the positive and negative side connecting members 25 and 26 are electrically connected to the fixed contact conductors 11 and 14' through the positive and negative side auxiliary terminals 22 and 23.

In this case, the insulating region 27, comprising the middle portion of the connecting member 24, is located at the center of a rectangular recessed portion 8 formed at the center of the case 3. A light emitting element 28 as an illuminating lamp (e.g., light emitting diode) has an anode side terminal 28a as one terminal and a cathode side terminal 28b as the other terminal inserted into the mounting holes 25a and 26a, respectively, of the positive and negative side connecting members 25 and 26 of the above connecting member 24. More specifically, the terminals 28a and 28b of the light emitting diode 28 are connected to the connecting members 25 and 26 respectively across the insulating region 27.

As shown in FIGS. 2, 11 and 15, a return member 29 composed of leaf spring is formed into a long shape and has engaging pieces 29a bent downward at each end thereof, arc-shaped recessed clearance portions 29b formed at the center thereof, and rectangular clearance holes 29c located at the right and left sides thereof.

As shown in FIGS. 2 and 3, formed on the upper surface of the above case 3 are T-shaped recessed engaging portions 30 and 31 positioned between knob stoppers 7 and L-shaped lugs 7a and 7b standing in the vicinity thereof. Support lugs 32 and 33 which are a little lower than the above knob stoppers 7 are formed so that the T-shaped heads of the recessed engaging portions 30 and 31 are separated from and do not contact the other portions. As shown in FIGS. 1 and 2, the return member 29 is placed between the support lugs 32, and the engaging pieces 29a thereof are inserted into the engaging recesses 30, respectively. The upper end of the actuator 21 passes through the clearance holes 29c of the return member 29 without interference, and the recessed clearance portions 29b are arranged to clear the light emitting diode 28.

As shown by FIGS. 2, 12 and 15, the long actuating member 34 has one end at which an engaging piece 34a projecting downward is provided and another end at which a fork-shaped locking member 34b projecting downward is provided. Further, as shown in FIGS. 2 to 4 and 15, the first and second actuators 21 and 21' are formed in such a way that the opposite sides thereof are located at positions lower than the center thereof and locking recessed portions 21a and 21a' are formed in the front and back sides thereof. As shown in FIGS. 2 and 4, the actuating member 34 is placed on the support 33 in the vicinity of the engaging piece 34a, and the engaging piece 34a is inserted into and engaged with the recessed engaging portion 31, and the engaging piece 34b is inserted into and locked with the recessed locking portion 21a' of the actuator 21'. In this situation, one of the recessed clearance portions 34c of the actuating member 34 serves to clear the light emitting diode 28.

Denoted by 35 is the knob, which will be described below with reference to FIGS. 1 and 4. The knob 35 comprises a plastic knob main body 36 and support pieces 37 projecting downward from the front and back sides thereof, and the support holes 37a of the support pieces 37 are engaged with the support lugs 6a of support pieces 6, whereby the main body of the knob is supported by the case 3 so that it can be swung in the direction of arrow A and in the opposite direction.

A transparent display plate 38 with characters, for example, "AUTO" is attached to the upper end of the knob main body 36. A light guide 39 composed of acrylic resin is formed integrally with and disposed in the knob main body, and is provided with a recessed portion 40 corresponding to the above display plate 38. The light guide 39 has pressing projections 41 and 42 formed thereon in correspondence to the above return member 29 and the actuating member 34. As shown in FIG. 1, a regulating lug 43 is defined at the center of the pressing projection 41. The right lower surface 41a of the pressing projection 41 is formed so that it has an angle of $(\theta_1+\theta_2)$ with respect to the upper surface of the knob stopper 7 about the center of rotation (the center of the support lug 6a and the support hole 37a), and the left lower surface 41b thereof is formed so that it has an angle of $\theta_1$. Note that in the figure the angle $\theta_1$ is set to, for example 14° and the angle $\theta_2$ is set to, for example, 7°. In this situation, the lower surface of the regulating lug 43 in the knob 35 is brought into contact with the upper central surface of the return member 29 in a plane contact state, whereby the knob 35 is held at the neutral position shown in FIGS. 1 and 4. Further, the pressing lug 41c in the knob 35 is held in abutment against the upper end portion of the actuator 21. The pressing projection 42 is arranged in a similar way to the pressing projection 41, and as shown in FIG. 4, has a right lower surface 42a, a left lower surface 42b and pressing lug 42c formed thereon similar to the right lower surface 41a, the left lower surface 41b and the pressing projection 41c. The left lower surface 42b is held in abutment against the upper end portion of the actuator 21'.

Figure 14:
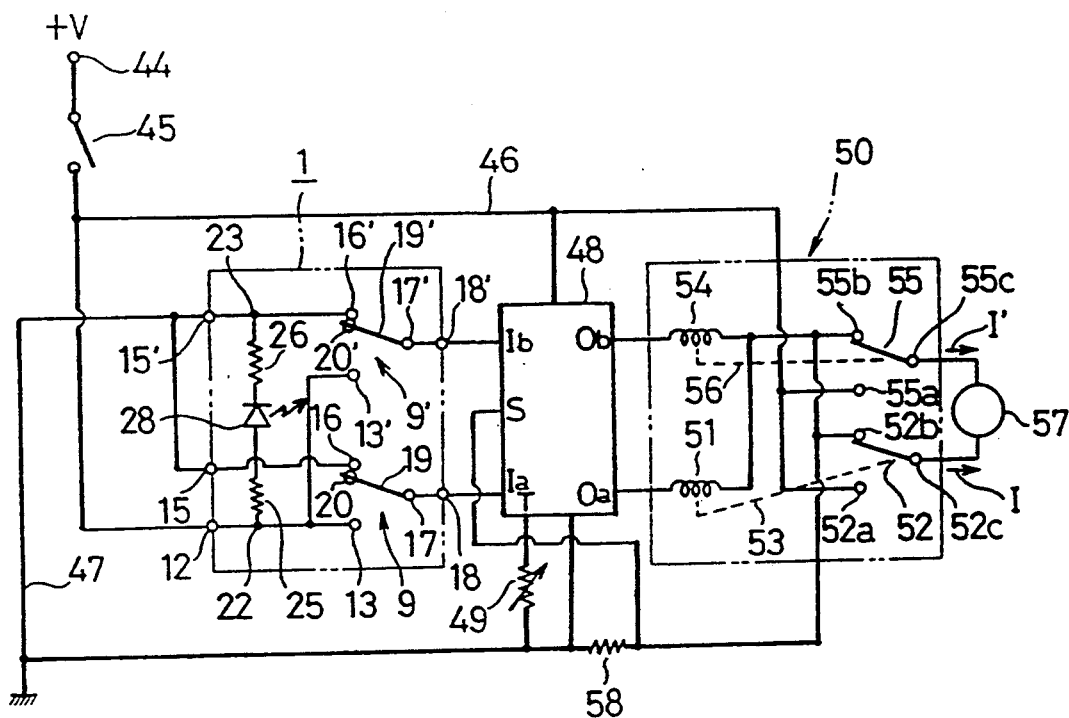
FIG. 14 is a circuit diagram of the embodiment.

Next, an electrical arrangement will be described below with reference to FIG. 14, wherein 44 designates a positive electrode (power supply voltage $+V$) of a battery as a DC power supply having a grounded negative electrode, the positive electrode being connected to a power supply line 46 through an ignition switch 45. The terminal 12 of the first switch 9 is connected to the power supply line 46 and the terminal 15 is connected to the terminal 15' of the second switch 9' and at the same time grounded through a ground line 47. Designated at numeral 48 is a detection control circuit connected across the power suppy line 46 and the ground line 47 and having input terminals Ia and Ib connected to the terminals 18 and 18' of the switch 9 and 9' and an external connection terminal T connected to the ground line 47 through a variable resistance 49. Designated at 50 is a relay circuit functioning as a drive circuit comprising a window-lowering relay 53 including an exciting coil 51, and a switching type relay switch 52; and a raising switch 56, including an exciting coil 54 and a switching type relay switch 55. One of the terminals of each of the exciting coils 51 and 54 is connected to the output terminals Oa and Ob of the detection control circuit 48 and the other terminals are connected to the power supply line 46. The open-at-rest contacts 52a and 55a of the relay switches 52 and 55 are connected to the power supply line 46 and a DC motor 57 as a load is connected across the movable contacts 52c and 55c thereof. The DC motor 57 is used to raise and lower the driver's side window of an automobile. The closed-at-rest fixed contacts 52b and 55b of the relay switches 52 and 55 are connected together and also to the detection terminal S of the detection control circuit 48 as well as to the ground line 47 through a detection resistance 58. As shown in FIG. 13, when the input signals of both the input terminals Ia and Ib of the above detection control circuit 48 are at a low level L, the detection control circuit 48 makes and emits from the output terminals Oa and Ob an output signals at a low level L (ground potential), when the input signal of the input terminal Ia is at a high level H and the input signal of the input terminal Ib is at a low level L, the detection control circuit 48 makes from the output terminal Oa an output signal at high level H (power supply potential $+V$), only while this state is maintained, and when the input to the input terminal Ia is at a low level L and the input signal to the input terminal Ib is at a high level H, the detection control circuit 48 makes and emits from the output terminal Ob an output signal at high level H, only while this state is maintained. When both inputs to the input terminals Ia and Ib are at a high level H, the detection control circuit 48 makes and emits from the output terminal Oa an output signal at high level H and keeps emitting the output signal from the output terminal Oa at high level H even if the state of the above input signals is changed. Thereafter, when the movement of the window glass is completed, the DC motor 57 is locked, and the voltage detected across the terminals of the detection resistance 58 becomes equal to or more than a set value, causing the above output signal from the output terminal Oa to be returned to a low level L. Note that the variable resistance 49 connected to the external connection terminal T of the detection control circuit 48 is used to adjust the above set value.

Next, operation of this embodiment will be described.

First, in FIGS. 1 and 4, a displacement force in an obliquely upward direction is applied to the free ends of the movable contact plates 19 and 19' by a spring force produced by the curved portions 19b and 19b' of these movable contact plates, and the upward component thereof keeps the movable contacts 20 and 20' in a returned-to-rest state in which they are brought into contact with the closed-at-rest fixed contacts 16 and 16'. When the ignition switch 45 is turned on in this state, an energizing circuit for the light emitting diode 28 is formed, and electricity is conducted through the positive electrode 44 of the battery, the ignition switch 45, the terminal 12, the positive side auxiliary terminal 22, the positive side connection member (resistance member) 25, the light emitting diode 28, the negative side connection member (resistance member) 26, the negative side auxiliary terminal 23, the terminal 15', and the ground, whereby the light emitting diode emits light to illuminate the display plate 38 of the knob 35 supported by the support pieces 6 of the case 3. Further, since the terminals 18 and 18' have the ground potential when the movable contacts 20 and 20' of the switches 9 and 9' are brought into contact with the closed-at-rest fixed contacts 16 and 16' (i.e., when the closed-at-rest contacts are closed and the open-at-rest contacts are open), both the input signal of input terminal Ia and of terminal Ib of the detection control circuit 48 are at a low level L and both the output signals from the output terminals Oa and ob thereof are also at a low level L. Therefore, the relay switches 52 and 55 of the respective relays 53 and 56 are in the state shown in FIG. 14, and thus both ends of the DC motor 57 have the ground potential and thus no current is supplied to the DC motor 57 (stop control mode).

Figure 8:
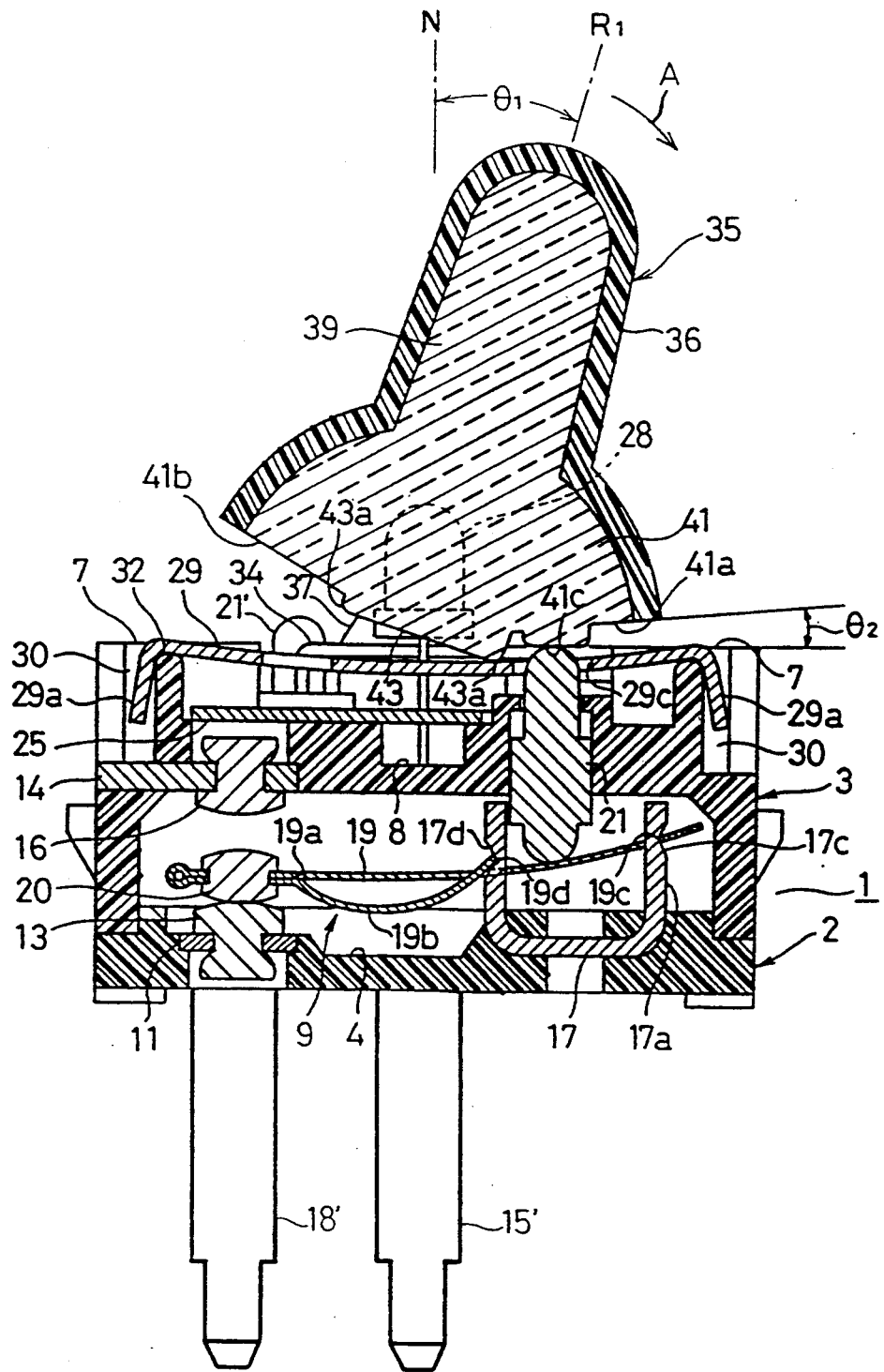
FIG. 8 is a diagram showing the operation of FIG. 2.

When the knob 35 is swung or turned by the angle $\theta_1$ in the direction of arrow A from the neutral position N so as to be located at a first right side position $R_1$, as shown in FIG. 8, the right corner 43a of the corners 43a of the regulating lug 43 presses the return member 29. Therefore, the return member 29 is deflected and deformed downward and at the same time, the reaction of member 29 applies a reciprocal return force to the knob 35 in a direction opposite to the direction it was swung or turned, i.e., opposite to the direction of the arrow A. Further, the knob 35 being turned in the arrow A direction causes the pressing lug 41c to press the first actuator 21. Therefore, the base of the movable contact plate 19 is deformed in a curve and displaced downward.

Thereafter, when the base of the movable contact plate 19 is located below the portion (the locking portion 17d) where the second support portion 17b is locked to the fulcrum 19d, an obliquely downward displacing force is applied to the free end of the movable contact plate 19 by the spring force of the curved portion 19b and the free end is quickly moved downward by the downward component thereof, whereby a snap action is effected to enable the movable contact 20 to be separated from the closed-at-rest fixed contact 16 and to be brought into contact with the open-at-rest fixed contact 13 (i.e., so that the closed-at-rest contact is open and the open-at-rest contact is closed). With this arrangement, since the terminal 18 has the power supply potential +V, an input signal of the input terminal Ia of the detection control circuit 48 is made at a high level H and an output signal from the output terminal Oa thereof is emitted at a high level H (power supply voltage +V).

Therefore, the exciting coil 51 is energized to operate the window-lowering relay 53, which enables the movable contact 52c of the relay switch 52 to be brought into contact with the fixed contact 52a (causing the switch 52 to be turned on). As a result, an energizing circuit for turning the DC motor 57 in the positive direction is formed through the positive electrode 44 of the battery, the ignition switch 45, the fixed and movable contacts 52a and 52c of the relay switch 52, the DC motor 57, the movable and fixed contacts 55c and 55b of the relay switch 55, the detection resistance 58, and the ground, by way of illustration and thus a current I flows through the DC motor 57 to enable it to be positively turned, whereby the driver's side window is lowered (lowering control mode).

Thereafter, when the force turning the knob 35 in the direction of arrow A is removed, the knob is turned in the opposite direction to that of arrow A by the spring force of the return member 29 until it returns to the neutral position N. Therefore, when the pressing force applied to the actuator 21 by the knob 35 is removed, the movable contact plate 19 is restored by the spring force of return member 29, so that the base thereof is then located at a position higher than the fulcrum 19d, and an obliquely upward displacing force is applied to the free end by the spring force of the curved portion 19b. Therefore, the free end is quickly moved upward and thus a snap action is effected to enable the movable contact 20 to be separated from the open-at-rest fixed contact 13 and brought into contact with the closed-at-rest fixed contact 16, and thus the state in FIG. 1 is restored.

Accordingly, since the terminal 18 again has the ground potential, an input signal at the input terminal Ia and an output signal emitted from the output terminal Oa of the detection control circuit 48 are at a low level L. As a result, the exiting coil 51 is de-energized to enable the window-lowering relay 53 to be returned-to-rest and the movable contact 52c of the relay switch 52 to be separated from the fixed contact 52a and brought into contact with the fixed contact 52b (so as to open or turn off the switch 52).

As a result, the above positive turning circuit of the DC motor 57 is cut off and thus the driver's side window is stopped when it reaches a completely lowered position.

Although the above description applies to the case in which the first switch 9 is operated, the case in which the second switch 9' is operated is substantially the same as the above case. More specifically, when the knob 35 is turned in a direction opposite to the direction of arrow A from the neutral position N, the left lower surface 42b of the pressing projection 42 of the knob 35 presses the second actuator 21' downward and thus the movable contact plate 19' enables the movable contact 20' to be brought into contact with the open-at-rest fixed contact 13' (i.e., the open-at-rest contact is closed). Since the terminal 18' has the power supply voltage +V at this time, an input signal at the input terminal Ib of the detection control circuit 48 is made at a high level H and an output signal is emitted from the output terminal Ob thereof, the output also being made at high level H (power supply voltage +V). With this arrangement, the exciting coil 54 is energized, and thus the window-raising relay 56 is operated and the movable contact 55c of the relay switch 55 is brought into contact with the fixed contact 55a. As a result, a circuit for turning the DC motor in the reverse direction is formed, and a current I flows through the positive electrode 44 of the battery, the ignition switch 45, the fixed and movable contacts 55a and 55c of the relay switch 55, the DC motor 57, the movable and fixed contacts 52c and 52b of the relay switch 52, the detection resistance 58, and the ground, and the current I flowing through the DC motor 57 enables it to be turned in a reverse direction, whereby the driver's side window is raised (raising control mode). Thereafter, when the force turning the knob 35 in a direction opposite to the direction of arrow A is removed, the knob is turned in the direction of arrow A by the spring force of the return member 29 and returns to the neutral position N, and thus the switch 9' is returned to the state shown in FIG. 4.

Figure 9:
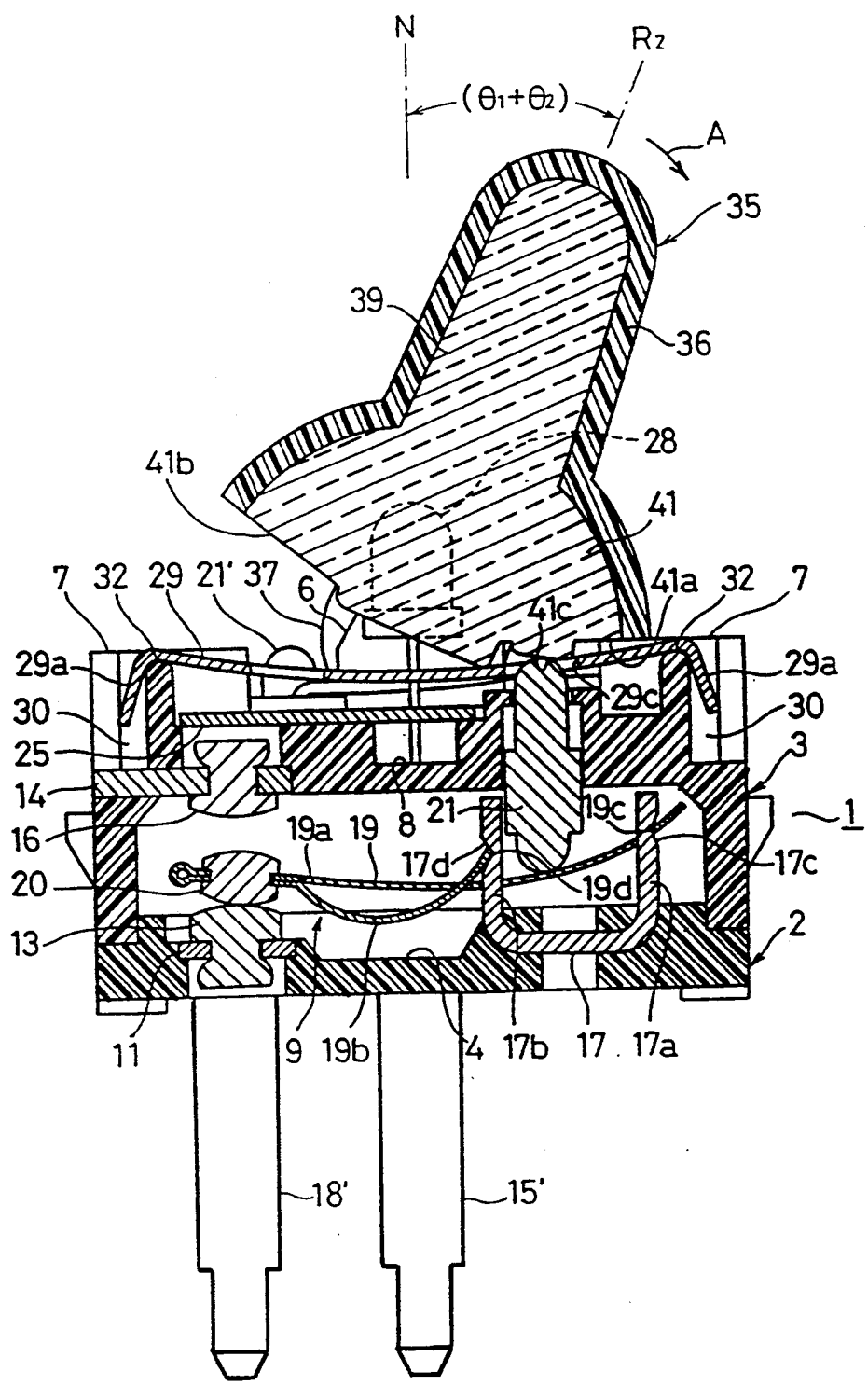
FIG. 9 is a diagram showing the operation of FIG. 1 having a swing angle larger than that of FIG. 7.

As shown in FIGS. 5 and 9, when the knob 35 is turned by an angle of $(\theta_1 + \theta_2)$ degrees in the direction of arrow A, that is, when it is further turned by the angle $\theta_2$ from the state shown in FIG. 8 and located at a second right side position $R_2$, the first actuator 21 is pressed farther than in the state shown in FIG. 8 by the pressing lug 41c. As shown in FIG. 9, when the knob is turned by an angle of $\theta_1$, the first switch 9 enables the movable contact 20 to be separated from the closed-at-rest fixed contact 16 and held in contact with the open-at-rest fixed contact 13, activating switch 9.

Then, when the knob 35 is turned to the second right side position $R_2$ as described above, the second switch 9' is also activated, in the following way: the pressing lug 42c of the pressing projection 42 presses the actuating member 34, as shown in FIG. 5, and thus the actuating member 34 is turned downward, rotating about the right support lug 33, to press the second actuator 21'. In this arrangement, the second switch 9' is switched to enable the movable contact 20' to be separated from the closed-at-rest fixed contact 16' and brought into contact with the open-at-rest fixed contact 13', so that both switch 9 and switch 9' are activated. More specifically, when the knob 35 is turned to the second right side position $R_2$ from the neutral position N, both the switches 9 and 9' are switched so that the closed-at-rest contacts thereof are opened and the open-at-rest contacts thereof are closed.

With this arrangement, since both the terminals 18 and 18' have the power supply voltage +V, the input signal of the input terminal Ia and that of Ib of the detection control circuit 48 are both made at a high level H and the output signal emitted from the output terminal Oa thereof is also at high level H. Therefore, as described above, when the window-lowering relay 53 is operated, a positive turning current circuit similar to the above mentioned is formed to turn the DC motor 57 in a positive direction, whereby the driver's side window is lowered.

Thereafter, when the force turning the knob 35 in the arrow A direction is removed, the knob is returned to the neutral position N by the spring force of the return member 29. When this happens, the pressing force applied to the first actuator 21 by the pressing lug 41c and the pressing force applied to the second actuator 21' by the actuating member 34 are removed, so that the switches 9 and 9' are returned to the states shown in FIGS. 1 and 4.

Therefore, both the terminals 18 and 18' have the ground potential and are changed so that the input signals of the input terminal Ia and of Ib of the detection control circuit 48 are both made at a low level L, but the detection control circuit 48 keeps emitting an output signal from the output terminal Oa at high level H regardless of the change of the state of the input signals. Therefore, a continuous energizing circuit is formed to continuously turn the DC motor in a positive direction 57, whereby the driver's side window is continuously lowered until the window is completely open (automatic lowering control mode).

Since the window is restricted from being further lowered when it is lowered to the lowest position, a locking current larger than the usual current I is conducted through the DC motor 57 and also through the detection resistance 58. As a result, the voltage produced across both the terminals of the detection resistance 58 is larger than the usual value, i.e., it has a value larger than a value adjusted and set by the variable resistance 49; and the detection control circuit 48 detects the increase in voltage, and in response, returns the output signal emitted from the output terminal Oa to low level L. As a result, the lowering relay 53 is returned, whereby the continuous (positive turn) energizing circuit of the DC motor 57 is cut off.

According to this embodiment, the following effects can be obtained.

The switching states of the switch 9 and 9' of the switch device 1 are detected by the detection control circuit 48 as the four states, "L, L", "H, L", "L, H", and "H, H" of input signals at the input terminals Ia and Ib. A power supply stop state, positive turn energizing circuit, reverse turn energizing circuit, and continuous positive turn energizing circuit of the DC motor 57 are formed to execute four control modes by which the driver's side window is stopped, lowered, raised, and automatically lowered, by the operation and returning of the relays 53 and 56 of the relay circuit 50 in accordance with the detection. As a result, the provision of an automatic lowering switch is not needed to execute the automatic lowering control mode separately from and independently of a conventional switch device, and therefore, the switch device 1 is arranged more simply and conveniently and the cost thereof is reduced.

Further, when the knob 35 is turned in the direction of arrow A to the first right side position R₁ from the neutral position N, the first actuator 21 is pressed by the pressing lug 41c of the knob 35 to enable the first switch 9 to be switched. When the knob 35 is turned in the direction opposite to the direction of arrow A from the neutral position N, the second actuator 21' is pressed by the left lower surface 42b of the knob 35 to enable the second switch 9' to be switched. Then, when the knob 35 is turned in the arrow A direction to the second right side position R₂ from the neutral position N, the first actuator 21 is pressed by the pressing lug 41c of the knob 35 to enable the switch 9 to be switched and the actuating member 34 is pressed by the pressing lug 42c of the knob 35 to press the second actuator 21' through the actuating member 34, whereby the second switch 9' is switched. Therefore, the single switch device 1 is provided with the function of selectively switching one of the switches 9 and 9' and the function of simultaneously switching both the switches 9 and 9'. As a result, there is an advantage in that the cost of the switch device is reduced and only one mounting space is needed as compared with, for example, the case in which two kinds of switch devices having the above two respective functions are provided.

Further, the switches 9 and 9' in the switch device 1 are the same as those in a usual switch device which are selectively switched by actuating a knob. The above two functions can be provided by a minor modification in that the knob 35 is used in place of a usual knob and the actuators 21 and 21' having the locking recessed portions 21a and 21a' are used in place of a usual actuator and by a simple additional arrangement, namely, the provision of the actuating member 34 in the case 3. Therefore, the same mechanical parts as those used in a usual switch device can be readily used and thus a large cost reduction can be expected.

Furthermore, the positive side auxiliary terminal 22 originates at the fixed contact conductor 11 which is connected to the positive electrode 44 of the battery in the switch 9, the negative side auxiliary terminal 23 originates at the fixed contact conductor 14' which is connected to the ground as the negative electrode of the battery in the switch 9' and both the auxiliary terminals 22 and 23 project upward from the upper surface of the case 3. In addition, the connecting member 24 in which positive and negative side connecting members 25 and 26 comprising a resistance member integrally formed with the insulating region 27 interposed therebetween is mounted on the upper surface of the case 3 and the above positive and negative side auxiliary terminals 22 and 23 are relatively inserted into the insert holes 25b and 26b at the opposite ends thereof. The anode and cathode side terminals 28a and 28b of the light emitting diode 28 are attached to the mounting holes 25a and 26b of the positive and negative side connecting members 25 and 26 by being inserted therethrough under pressure. Therefore, the light emitting diode 28 can be easily mounted and wired.

Although the present invention is described above with reference to an embodiment applied to a window regulator of an automobile, it is not limited thereto, but applicable to load driving devices in general, and thus the switch device is not limited to the one having the two switches 9 and 9', but may simply have any two on and off switches.

What is claimed is:

1. A switch device for controlling a driving means for selectively performing forward or reverse driving actions, comprising:

(a) a pair of switches comprising first and second switches capable of operating independently of each other;

(b) a control means having a control circuit for entering, when signals are input from said pair of switches, a first output state in which neither of said pair of switches is activated, a second output state in which said first switch is activated, a third output state in which said second switch is activated, and a fourth output state in which both of said pair of switches are activated; and (c) an activating means for causing said driving means to perform three different driving actions, as well as to stop, in correspondence with said four output states of said control circuit, respectively.

2. A switch device according to claim 1, wherein said activating means selectively activates said driving means in two distinct ways, first, for driving a load which is driven in either of two directions for only as long as said switch device is operated in either of two different "on" positions causing said control circuit to be in said second and third output states respectively, and second, for driving said load in one of said two directions until a desired driving action is completed, in response to said operating member being moved briefly in one direction, past one of said "on" positions, thereby causing the control circuit to enter and stay in said fourth output state until the desired driving action is finished.

3. A switch device according to claim 2, wherein said activating means has a relay circuit for maintaining the driving action of said driving means thereby causing it to continue driving the load until the desired action is completed, said relay circuit being activated in response to said fourth output state of said control circuit.

4. A switch device according to claim 3, wherein said relay circuit connects the terminal of a motor to the positive pole or negative pole of a power supply in order to change the rotational direction of a motor of said driving means in correspondence with said second and third output states of said control circuit.

5. A switch device according to claim 1, wherein said control circuit includes a detection circuit for detecting a large current flowing into said driving means as the result of the completion of a desired driving action, said driving action having been accomplished in response to said fourth output state of said control circuit, and for changing said control circuit to said first output state upon detection of said large current.

6. A switch device according to claim 3, wherein said driving means is not energized as long as said relay circuit is not energized so that no driving action occurs when said control circuit is in said first output.

7. A switch device according to claim 1, further comprising an operation knob, and wherein said pair of switches is activated by said operation knob operated in three different ways, a first way, wherein said first switch is activated when said knob is moved in one direction to a first "on" position and a second way, wherein said second switch is activated when said operation knob is moved in a second direction to a second "on" position, and a third way, wherein said operation knob is moved further in said one direction, past said first "on" position, said third way corresponding to said fourth output state of said control circuit in which second switch is activated in addition to and simultaneously with said first switch.

8. A switch device according to claim 7, wherein an interlocking means is provided for activating said second switch upon the operation of said operation knob in said third way in which said operation knob is moved further in said first and second ways.

9. A switch device according to claim 1, wherein said driving means includes a motor and said activating means drives said motor for raising and lowering a window glass of an automobile, lowering or raising the glass for as long as said operating member is held in one or the other of two operating positions, a first position corresponding to a state in which said first switch is activated and a second position corresponding to a state in which said second switch is activated.

10. A switch device according to claim 9, wherein said activating means is provided with a relay for keeping the motor in an energized state, for as long as said first and second switch are separately activated.

11. A switch device according to claim 10, wherein said relay is operated for activating said driving means so as to drive a window glass and to keep the operation until a predetermined action is completed, when both said first and second switches are simultaneously activated.

12. A switch device according to claim 11, wherein said relay has a first relay for connecting one terminal of the motor to an automobile power supply and a second relay for connecting the other terminal of the motor to the ground.

13. A switch device according to claim 11, wherein said relay is automatically shut off when the load on the motor is sharply increased.

14. A switch device for raising and lowering a window glass of an automobile, comprising:

(a) a motor for raising and lowering the window glass;

(b) an operation knob to be operated by an occupant;

(c) a first and second switch for respectively responding to the operation of said operation knob to be operated by an occupant;

(c) a first and second switch for respectively responding to the operation of said operation knob in either one of two directions; and (d) a control circuit which drives said motor in response to the separate activation of said first and second switches, alternatively raising or lowering a window glass as long as said operation knob is being held in one or the other of "on" positions thereof, and also drives the window glass all the way down until it is completely opened when both the switches are simultaneously activated.

15. A switch device according to claim 14, wherein, when the operating knob is momentarily flicked to an "automatic" position beyond one of said "on" positions, at which both of said first and second switches are simultaneously activated.

16. A switch device according to claim 14, wherein said control circuit detects the point of completion of the lowering of a window glass and stops the driving of said motor.

17. A switch device according to claim 16, wherein, when said window glass is completely lowered, a control circuit detects an increase in the load on said motor.

18. A switch device according to claim 14, wherein, in the state in which both said first and second switches are activated, said motor is activated by a relay circuit and said switch device keeps said motor in a driving state until the window glass has reached its final position, even if said operation knob is released by said occupant.

19. A switch device for raising and lowering a window glass of an automobile, comprising:
  (a) a motor for raising and lowering the window glass;
  (b) an operation knob moved by a passenger when the window glass is to be raised or lowered;
  (c) a first switch activated by the operation of said operation knob in a first direction by a first predetermined amount of operation;
  (d) a second switch operated by the operation of said operation knob in a second direction by a second predetermined amount of operation;
  (e) an interlocking means for activating the second switch as well as the first switch in response to the operation of said operation knob in said first direction by a third predetermined amount beyond the first predetermined amount; and
  (f) a control means for activating the motor in such a way as to move the window glass downward for as long as said switch device is in a state in which only said first switch is activated, and for activating the motor in such a way as to move the window glass upward for as long as said switch device is in a state in which only said second switch is activated, and for activating said motor in such a way as to lower the window glass until it is completely closed when said device is in a state in which both said first and second switches are activated.

20. A switch device according to claim 19, wherein said control means activates the motor via a relay circuit and keeps said motor operating until the window glass is completely lowered, when the switch device is in a state in which both said first and second switches are simultaneously activated.

21. A switch device for controlling a driving means for selectively performing forward or reverse driving actions, comprising:
  (a) a pair of switches comprising first and second switches capable of operating independently of each other; and
  (b) a control means having a control circuit for entering, when signals are input from said pair of switches, a first output state in which neither of said pair of switches is activated, a second output state in which said first switch is activated, a third output state in which said second switch is activated, and a fourth output state in which both of said pair of switches are activated.

* * * * *